(12) United States Patent
Krikorian et al.

(10) Patent No.: US 7,298,325 B2
(45) Date of Patent: Nov. 20, 2007

(54) TECHNIQUE FOR ACCURATE ESTIMATE OF LARGE ANTENNA INERTIAL TWO DIMENSIONAL ORIENTATION USING RELATIVE GPS SPATIAL PHASE

(75) Inventors: Kapriel V. Krikorian, Calabasas, CA (US); Robert A. Rosen, Agoura Hills, CA (US)

(73) Assignee: Raytheon Company, Waltham, MA (US)

( * ) Notice: Subject to any disclaimer, the term of this patent is extended or adjusted under 35 U.S.C. 154(b) by 115 days.

(21) Appl. No.: 11/294,227

(22) Filed: Dec. 5, 2005

(65) Prior Publication Data

US 2007/0126629 A1    Jun. 7, 2007

(51) Int. Cl.
*H01Q 3/00* (2006.01)
(52) U.S. Cl. ................... 342/359; 342/357.04
(58) Field of Classification Search ............... 342/442, 342/357.01, 357.04, 357.06, 359, 357.11
See application file for complete search history.

(56) References Cited

U.S. PATENT DOCUMENTS

| | | | | |
|---|---|---|---|---|
| 5,657,031 | A * | 8/1997 | Anderson et al. | 343/757 |
| 6,005,514 | A * | 12/1999 | Lightsey | 342/365 |
| 6,754,584 | B2 * | 6/2004 | Pinto et al. | 701/215 |
| 6,853,330 | B1 * | 2/2005 | Krikorian et al. | 342/149 |

2003/0206139 A1 * 11/2003 Challoner ................... 343/757

* cited by examiner

*Primary Examiner*—Dao Phan
(74) *Attorney, Agent, or Firm*—Leonard A. Alkov

(57) ABSTRACT

A radar antenna has a reflector and maximum gain along its boresight. The reflector has a periphery, typically circular, rectangular or elliptical. A plurality of Global Positioning System (GPS) satellite signal receiving antennas are rigidly, mechanically attached to the reflector near its periphery. The plurality of GPS satellite signal receiving antennas are connected pairwise to a phase comparator for comparing a plurality of first phase differences induced by a first GPS satellite signal received concurrently between the plurality of GPS satellite signal receiving antennas. A Phase comparator measures the phase difference of the signal received at GPS satellite signal receiving antennas pairwise thus performing a differential phase measurement. This differential phase measurement is supplied to a computer for identifying an ambiguous boresight position using the phase differences measured by the phase comparator. The position of the GPS satellites is known with respect to the geolocation of the antenna. Thus, the boresight angle is derived from the phase difference of the carrier signal from the GPS satellite being received and the mechanical alignment information between the GPS satellite receiving antennas and radar antenna boresight stored during calibration/manufacture of the radar antenna. The ambiguity in the computed boresight position is resolved by making differential phase readings using the same GPS antennas from a second GPS satellite signal supplied by a second satellite.

16 Claims, 5 Drawing Sheets

TECHNIQUE FOR ACCURATE ESTIMATE OF LARGE ANTENNA INERTIAL TWO DIMENSIONAL ORIENTATION USING RELATIVE GPS SPATIAL PHASE

BACKGROUND OF THE INVENTION

1. Field of Invention

This invention is in the field of antenna position location using signals from a satellite constellation part of the Global Positioning System (GPS).

2. Description of the Related Art

Synthetic Aperture Radar (SAR) is used for ground mapping as well as target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is coherently combined to arrive at a high resolution SAR image.

The plurality of returns creating a SAR image generated by the transmitted pulses along a presumed known path of the platform make up an array. Theoretically, during the array, amplitude as well as phase information returned from each of the pulses, for each of many range bins, is preserved. That is, the SAR image is formed from the coherent combination of the amplitude and phase of return(s) within each range bin, motion compensated for spatial displacement of the moving platform during the acquisition of the returns for the duration of the array.

The usefulness of a SAR image is dependent on accurate knowledge of antenna orientation with respect to a local coordinate during the acquisition of the SAR image. Antenna orientation accuracy is critical to radar return motion compensation and map positioning within the local coordinate system. Motion compensation shifts the phase of each radar sample (typically an I+jQ complex quantity derived from an analog to digital converter) in accordance with the motion in space of the moving antenna, with respect to a reference point. The SAR imaging process depends on the coherent, phase accurate summing of all radar returns expected within an array. These principles are detailed by W. G. Carrara, R. S. Goodman and R. M. Majewski in *Spotlight Synthetic Radar*, Boston, Artech House, 1995, incorporated herein in its entirety by reference.

Antenna azimuth and elevation with respect to a geo reference was measured in the prior art with a mechanical angle transducer. Such an approach dependent on mechanical gears having backlash is insufficiently accurate where a SAR display depends on antenna angle orientation, especially where the SAR map has resolution of a few feet at a range of 50 nautical miles.

A tool recently introduced in geo-locating a radar is the Global Positioning System (GPS). GPS provides a constellation of satellites, each transmitting a timing signal. Simultaneous receipt of two, preferably three or more of the GPS satellite timing signals yields a geo-position with an accuracy of 20-30 meters. This accuracy is sufficient for determining the general location of an antenna but insufficient to determine antenna orientation in typical radar applications. Even using a differential approach, for example as described in U.S. Pat. No. 6,559,793, dated Nov. 2, 2001 to Eschenbach, assigned to Trimble Navigation Limited, incorporated herein in its entirety by reference, the resulting position accuracy is insufficient to be used for antenna orientation purposes.

SUMMARY OF THE INVENTION

Accurate radar antenna orientation measurement is obtained by a radar antenna that has a reflector and maximum gain along the boresight. The reflector forms a curved surface, where the curved surface is generally perpendicular to the radar antenna boresight at the point of intersection between the boresight and the reflector. The reflector has a periphery, circular, rectangular or elliptical. The radar antenna comprises a plurality of Global Positioning System satellite signal receiving antennas. The plurality of Global Positioning System satellite signal receiving antennas are positioned on the reflector, preferably along the periphery, equidistantly spaced and straddling the boresight. The plurality of Global Positioning System satellite signal receiving antennas are connected pairwise to a phase comparator for comparing a plurality of first phase differences induced by a first Global Positioning satellite signal received concurrently between the plurality of Global Positioning System satellite signal receiving antennas.

A Phase comparator measures the phase difference of the carrier signal received at Global Positioning System satellite signal receiving antennas thus performing a differential phase measurement. The result of the differential phase measurement is supplied to a computer for identifying an ambiguous boresight position using the phase differences measured by the phase comparator. The position of the GPS satellites is known with respect to the geo-location of the radar antenna. Thus, the boresight angle is derived from the phase difference of the carrier signal from the GPS satellite being received and fixed, mechanical alignment information between the GPS satellite receiving antennas and the boresight. The relationship between the GPS antennas and boresight is mechanically fixed, and stored during calibration/manufacture of the radar antenna. The ambiguity in the received phase position is resolved by taking differential phase reading from a second GPS satellite signal supplied by a second satellite, or a third, or a fourth.

DETAILED DESCRIPTION OF THE INVENTION

The present disclosure describes a method and apparatus for collecting antenna position measurements using phase measurements from a plurality of GPS sensors mechanically connected to structurally stiff locations on a large radar antenna, and combining the plurality of target motion measurements to improve overall antenna orientation accuracy as compared to previous approaches.

Figure 1:
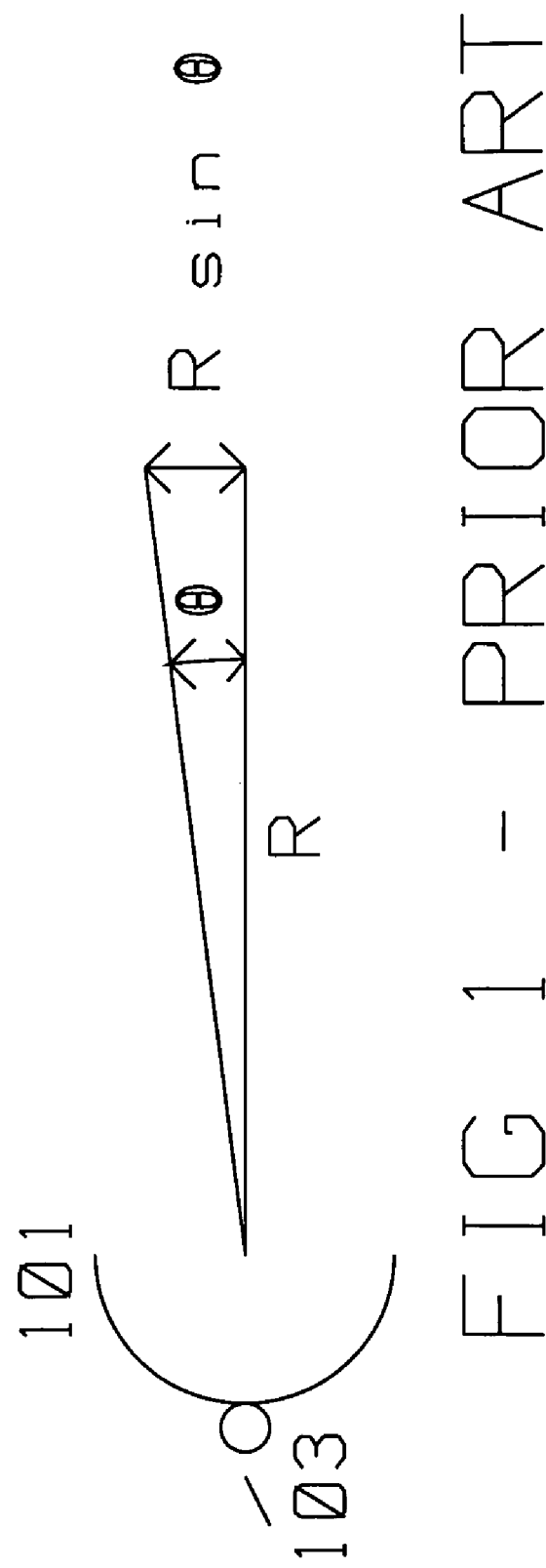
FIG. 1 is an antenna position sensor of the prior art and its typical azimuth error.

FIG. 1 shows an antenna 101 of the prior art where the azimuth orientation of the antenna is measured by a rotating angle transducer 103 capable of reporting the antenna azimuth angle position. From geometric considerations, if the uncertainty, or error of the reported azimuth angle from transducer 103 is θ, then the azimuth error at range R is:

Azimuth Error=R sin θ

For example, for R=50 nautical miles (nm), and θ=10 milliradians, (about ½ degree) the resulting azimuth error is approximately:

50 nm·6076.1 ft/nm·0.01 radians=3038 ft

Thus, mechanical angle transducers having an accuracy in the order of ½ degree are too coarse, or inaccurate to provide a meaningful indication of antenna azimuth position in radar systems requiring azimuth (cross range) accuracy in the order of 2 ft. Even a ten fold improvement in measuring θ by an angle transducer 103 would not be satisfactory in such a scenario: Given these high errors and associated limitations in deriving accurate images, it is desired to implement a viable method of measuring antenna orientation around an axis, applicable to both azimuth and elevation in the case of relatively large antennas having an energy receiving area in the order of 20 meters by 20 meters.

Figure 2:
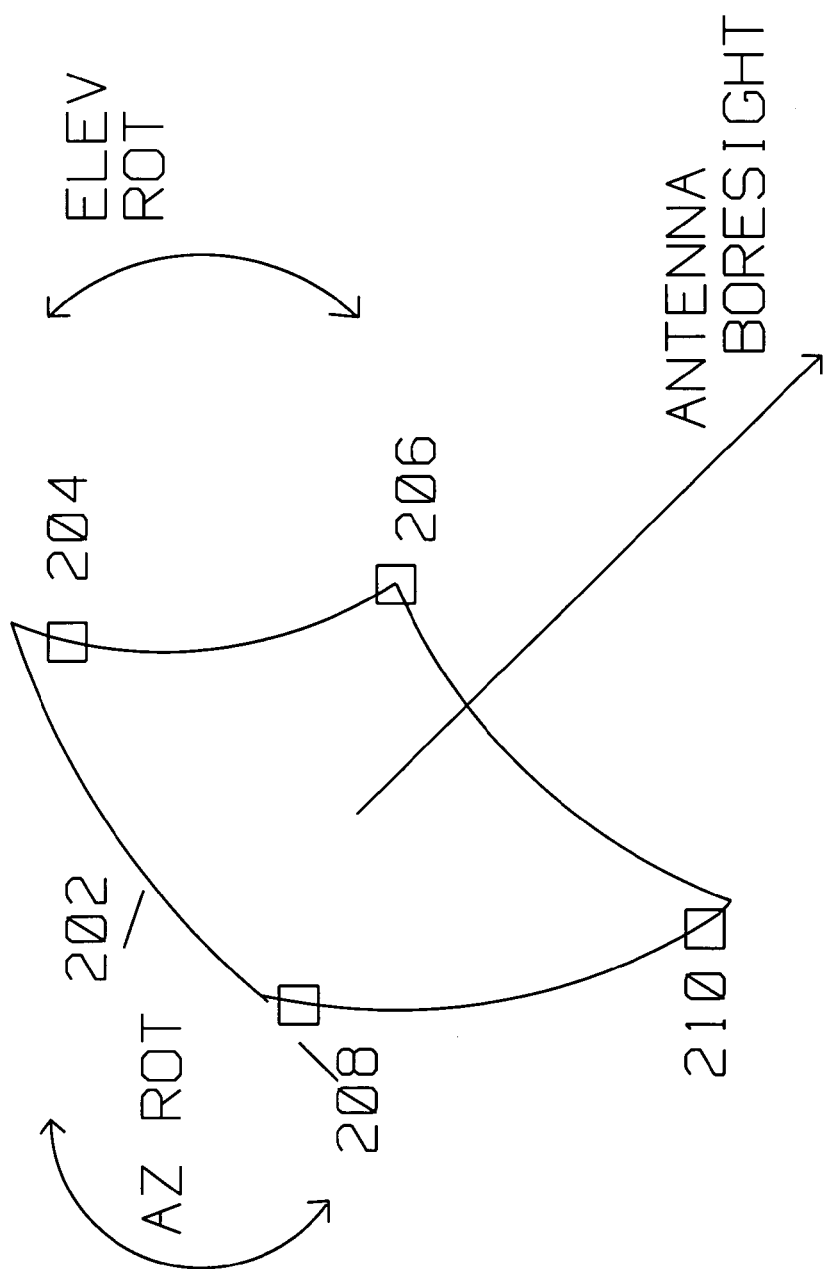
FIG. 2 shows a radar antenna having four GPS signal receiving antennas are rigidly mounted on the radar antenna reflector periphery, near the corners of the reflector.

In one embodiment of the present teachings, shown in FIG. 2, radar antenna 202 has four separate GPS (satellite signal) receiving antennas 204, 206, 208, 210 mechanically connected (welded) to the corners of radar antenna 202. It is assumed radar antenna 202 structure is relatively mechanically stiff, having a natural frequency under 10 hz. The mechanical stiffness insures that the antenna boresight initial alignment with the mechanical reference points represented by GPS receiving antennas 204, 206, 208, 210 remains constant during antenna motion whether said motion is induced from intentional antenna rotation or due to wind forces, rain, snow or ice. For example, radar antenna 202 is 20 meters by 20 meters in size, having a parabolic cross-section.

GPS receiving antennas 204, 206, 208 and 210 monitor not the exact position of the receiver itself derived from pulse code as is customary, but rather the relative carrier phase of the. GPS signal from a constellation of satellites being received at their particular locations on radar antenna 202. Thus, an accurate estimate of antenna two dimensional inertial orientation is derived using a measurement of relative GPS spatial phase. The relative carrier phase of the GPS signal from a plurality of geo-orbiting satellites, part of the GPS constellation, is measured between a plurality of GPS antennas, such as GPS receiving antennas 204, 206, 208 and 210. Phase bias errors and phase ambiguities are eliminated with measurements from multiple satellites, part of the GPS constellation of satellites.

For example, at typical GPS operating frequencies, thermal noise and associated position error of each GPS antenna is given by $$\frac{\lambda}{2\pi} \frac{1}{\sqrt{NPDI \cdot SNR}} = \frac{\lambda}{2\pi} \frac{1}{20} = 1.5 \text{ mm}$$

Where SNR is signal to noise ratio, and NPDI is number of pulses integrated.

The corresponding error is 0.076 milliradians.

The phase center error, defined as the GPS phase center relative to the nearest optical calibration point of radar antenna 202 is λ/40=5 mm where 5 mm corresponds to an angle error of 0.262 milliradians.

Phase linking with a common local oscillator between GPS receiving antennas 204, 206, 208, 210 and associate receiver(s) is not required.

Figure 3:
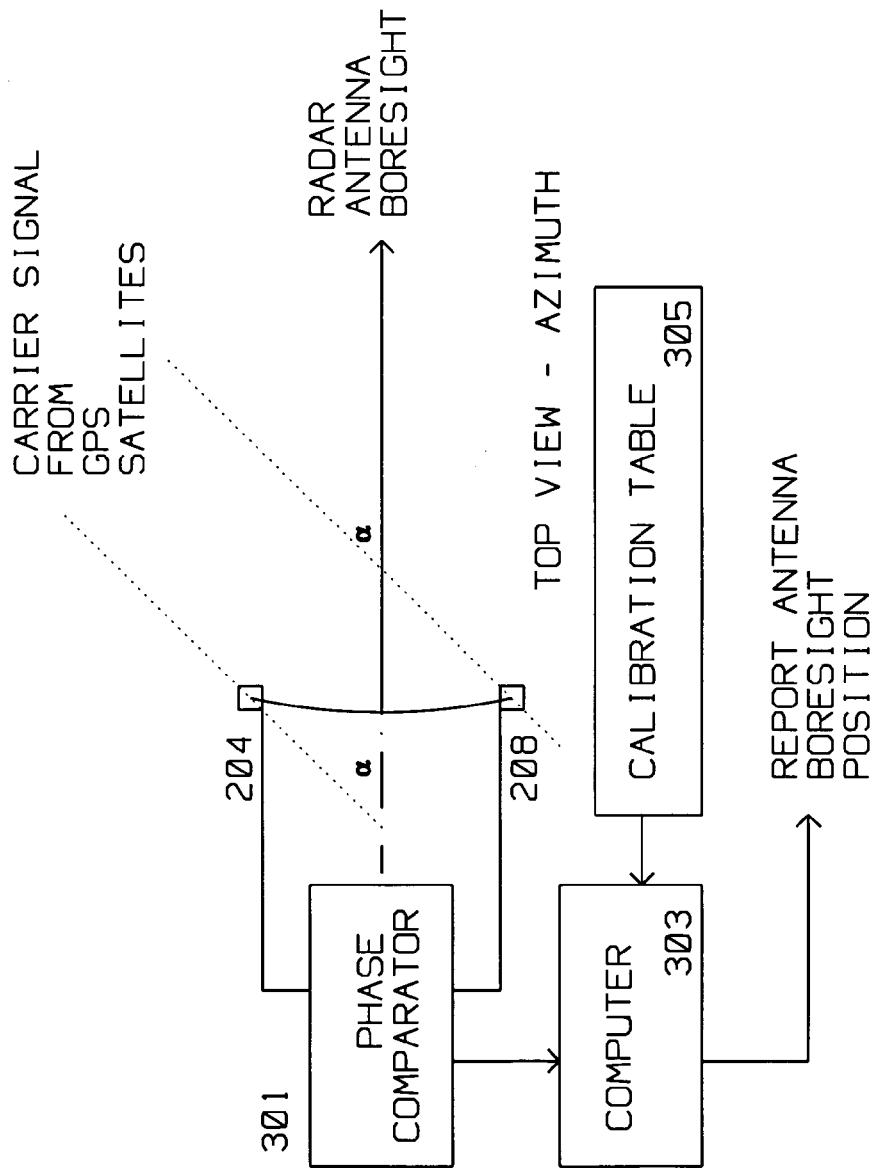
FIG. 3 shows a differential phase measurement being performed in azimuth using the carrier of the GPS signal supplied by one or more GPS satellites.

FIG. 3 further details the configuration of the embodiment of FIG. 2. Here the optical boresight corresponding to the peak of the antenna gain pattern of antenna 202 forms and angle α with the carrier signal form the GPS satellite. Antenna (optical) boresight is initially calibrated in azimuth by comparing the position of the antenna radiation/reception maximum, i.e. the peak of the antenna pattern, against the phase differences from GPS antennas 204 and 208 positioned at or near the outer periphery of antenna 202. Phase comparator 301 compares the incoming carrier signal received by GPS antenna 204 and GPS antenna 208 to generate a measured phase. The measured phase is initially calibrated against the antenna boresight position and stored in a table. As antenna 202 moves, and the reading from phase comparator 301 is obtained, the new reading is input into the table obtained during the calibration process, and antenna azimuth position read out.

Figure 4:
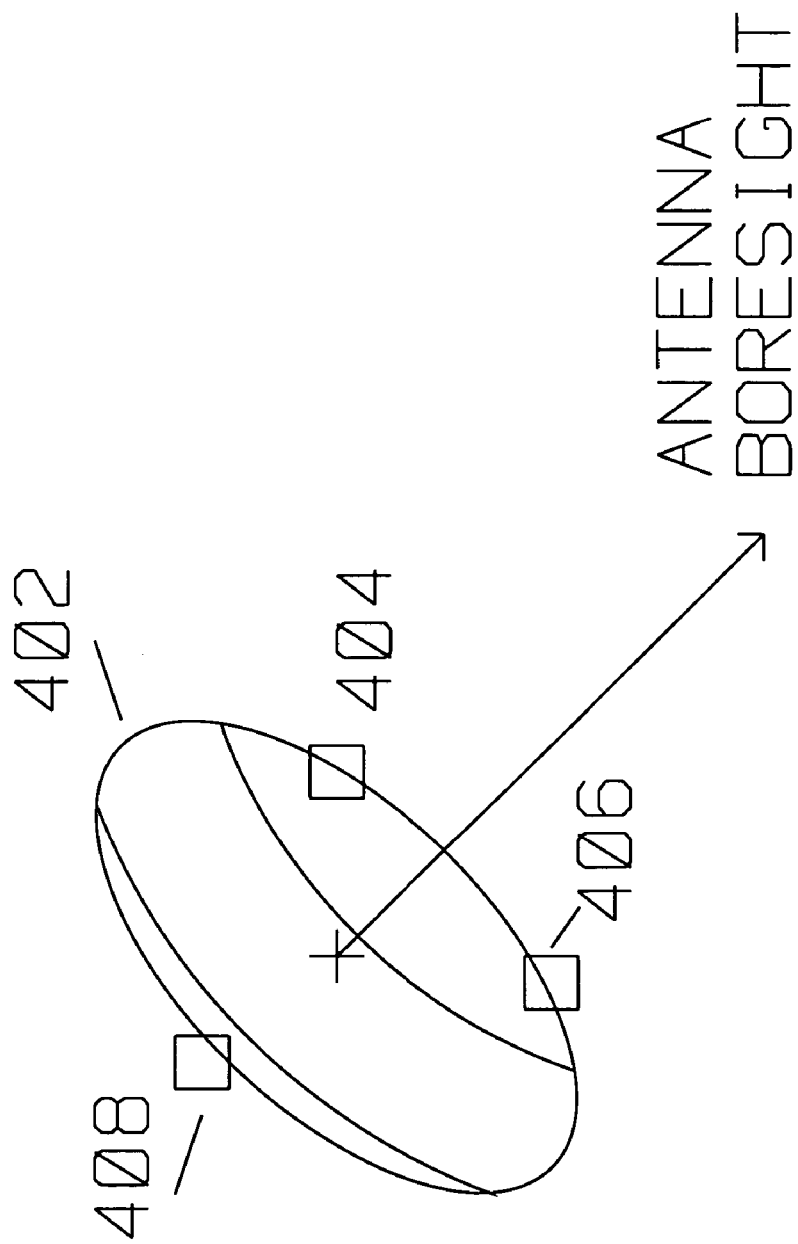
FIG. 4 shows a radar antenna where the reflector is circular and three GPS signal receiving antennas are used for differential phase measurement.

FIG. 2, and 3 show four GPS antennas generally equidistantly positioned around the periphery of antenna 202 as an example of how antenna boresight information can be derived from GPS carrier signals. However, a simpler embodiment is shown in FIG. 4. Here, only three GPS antennas, 404, 406, and 408 are equidistantly positioned along the periphery of a circular antenna 402. Phase difference measurements are taken between GPS antenna 404 and 406 to obtain an azimuth reading. Elevation measurements are obtained by comparing the phase received at GPS antenna 404 with the phase at GPS antenna 408. A calibration adjustment adjusts the phase read out for the position of GPS antenna 404 away from the vertical axis perpendicular to the antenna boresight. To simplify further, if only azimuth boresight position is required, only two GPS antennas, such as GPS antennas 404 and 406, will generate the required azimuth position. It is desired to space GPS antennas 404 and 406 as much as possible thereby generating a large phase difference in the received GPS signal carrier for the angular motion of antenna 402.

Taken together, FIGS. 2, 3 and 4 show a radar antenna 202 having a reflector for receiving and transmitting radar pulses and an antenna boresight. Antenna 202 has a maximum gain along the boresight. The reflector forms a curved surface, where the curved surface is generally perpendicular to the boresight at the point of intersection between the boresight and the reflector. The reflector has a periphery, either circular or rectangular. Antenna 202 comprises three or more Global Positioning System satellite signal receiving antennas such as 204, 206, 208 and 210 in FIG. 2 or 404, 406 and 408 in FIG. 4. The three or more Global Positioning System satellite signal receiving antennas are positioned on the reflector.

The three or more Global Positioning System satellite signal receiving antennas (204, 206, 208, 210) are connected pairwise to a phase comparator for comparing a plurality of first phase differences induced by a first Global Positioning satellite signal received concurrently between the three or more Global Positioning System satellite signal receiving antennas. FIG. 3 shows two such Global Positioning System satellite signal receiving antennas, 204 and 208 connected to phase comparator 301. The signal from the GPS satellite is the carrier, not the actual coded information. It is the carrier that provides the resolution necessary to perform the differential phase measurement.

Phase comparator 301 supplies the phase difference of the signal received at Global Positioning System satellite signal receiving antennas 204 and 208 to computer 303 for identifying an ambiguous boresight position using said first phase differences measured by said phase comparator. Since the position of the GPS satellites is known with respect to the geo-location of antenna 202, the angle α can be derived from the phase difference of the carrier signal from the GPS satellite being received.

Typically, as shown in FIG. 2 and FIG. 4 two of said three or more Global Positioning System satellite signal receiving antennas are straddling the boresight of the antenna. Also, in one embodiment, the three or more Global Positioning System satellite signal receiving antennas are positioned equidistant from the boresight in a plane perpendicular to the boresight.

For maximum angle sensitivity, it is desired to obtain maximum phase change for the least amount of angular displacement by antenna 202, or antenna 402, thus the three or more Global Positioning System satellite signal receiving antennas are positioned along the periphery of the reflector, or a boom extending from the antenna, but rigidly connected to it.

The phase comparator output for each pair of antennas, such as 204 and 208, is more efficiently processed if the three or more Global Positioning System satellite signal receiving antennas are positioned equidistantly along the periphery of said reflector. Using the same basis, two of the three or more Global Positioning System satellite signal receiving antennas (such as 204 and 208) are aligned with a horizontal plane, where the horizontal plane includes the boresight facilitating radar antenna 202 azimuth angular position measurements. Similarly, positioning two of the three or more Global Positioning System satellite signal receiving antennas, such as 208 and 210, aligned with a vertical plane, where the vertical plane includes the boresight facilitates radar antenna 202 elevation angular position measurements.

The concepts above expand upon GPS operation detailed in *GPS: Theory and Practice*, by Hoffman Wellenhof, B. H. Lichtenegger and J Collins 1994, 3rd ed, New York: Springer Verlag publishers, incorporated herein in its entirety by reference. Further details of GPS operation for this disclosure are also found in *Understanding GPS: Principles and Applications* Elliott D. Kaplan ed., 1996, Boston: Artech House Publishers, incorporated herein in its entirety by reference. Position measurements using phase comparison of GPS signals is further detailed in *GPS Satellite Surveying* 2nd ed, by Leick Alfred, 1995, New York; Wiley and Sons, incorporated herein in its entirety by reference.

Figure 5:
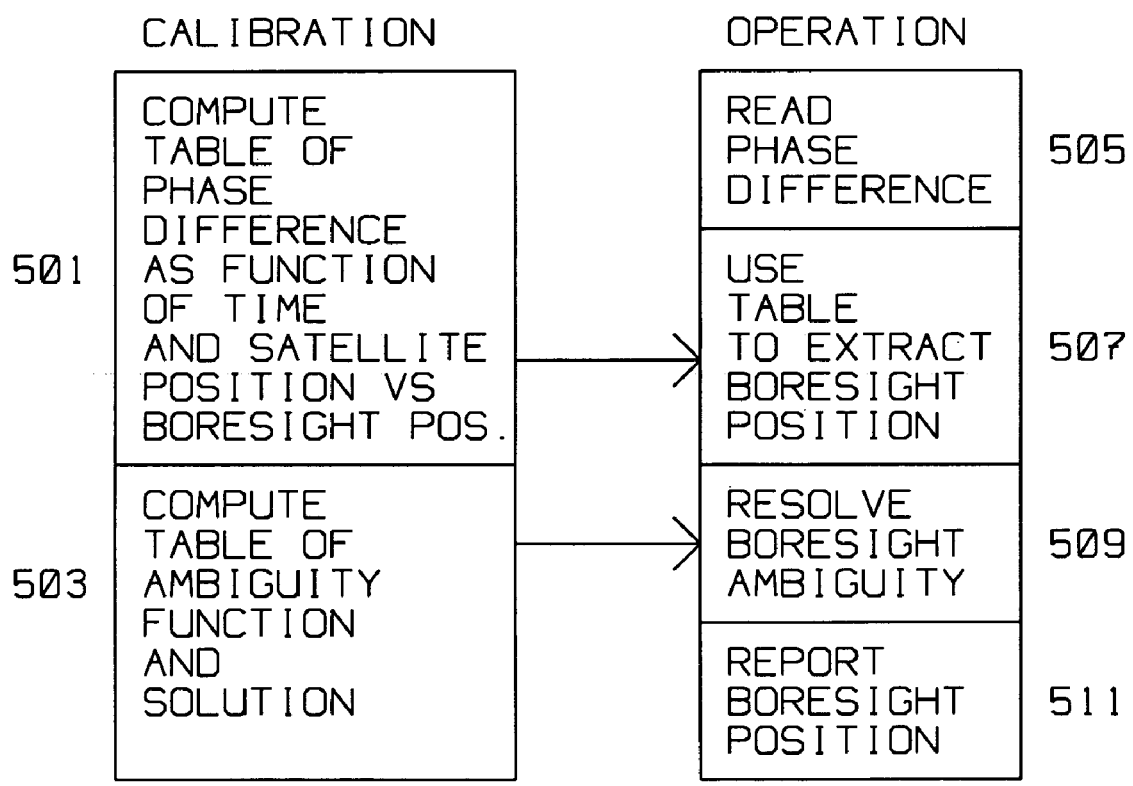
FIG. 5 shows the method of the calibration steps and operation of the radar antenna operating within a computer identifying the position of the boresight from differential phase measurements extracted from a GPS satellite signal carrier.

The method used is further detailed in FIG. 5. Computer 303 computes boresight position based on the inputs from the phase comparator 301. The initial step is to perform a calibration during the manufacturing of radar antenna 202 or 402. During the calibration, Compute Table of phase differences as a function of time and satellite position 501 is recorded. This creates a table, or function, within computer 303 identifying phase differences to be expected as a function of antenna boresight position with respect to the GPS signal received from the constellation of GPS satellites. A second table, or function, computed in Compute table of Ambiguity function and solution 503 resolves the ambiguity inherent in performing actual measurements by taking a second differential phase measurement using a second, a third, or a fourth GPS satellite.

In accordance with FIG. 5, after having performed the initial calibration, the method for identifying a boresight position of a radar antenna having a reflector for receiving and transmitting radar pulses and a radar antenna boresight, said radar antenna having a maximum gain along said boresight, said reflector forming a curved plane, said curved plane generally perpendicular to said boresight at the point of intersection between said boresight and said reflector, said reflector having a periphery, comprises the following steps.

1) Positioning three or more Global Positioning System satellite signal receiving antennas (e.g. 204, 206, 208, 210) on the reflector along its periphery;

2) Connecting the three or more Global Positioning System satellite signal receiving antennas to a phase comparator (such as phase comparator 301) for detecting a plurality of phase differences derived from a first Global Positioning satellite signal received among said three or more Global Positioning System satellite signal receiving antennas;

3) Identifying an ambiguous boresight position with respect to the first Global Positioning satellite from said first phase difference measured by the phase comparator by using Read Phase difference 505 to read the phase difference between GPS antennas of interest, i.e. antenna pairs 204 and 208 for an azimuth position, or the pairs 208 and 210 for elevation. Using this phase difference, obtained from the phase comparator, such as phase comparator 301, computer 303 uses table 501 in Use Table to extract boresight position 507 to extract an ambiguous boresight position. On performing a second phase measurement using another GPS satellite, the ambiguity of the ambiguous boresight position is resolved to generate an unambiguous boresight position using information in table 503. Report Boresight position 511 reports the unambiguous position for subsequent use in the processing of images.

All references cited in this document are incorporated herein in their entirety by reference.

Although presented in exemplary fashion employing specific embodiments, the disclosed structures are not intended to be so limited. For example, although the antenna orientation accuracy improvement herein is described in the context of a radar antenna, the disclosure is also applicable for sonar, or other large antennas where the orientation of the large antenna is independently determined by a plurality of phase sensors mechanically linked to the antenna. The phase sensors supply phase measurements to a phase comparator, thus deriving antenna azimuth and elevation orientation from receiving a reference signal from a source having a known location at a particular time. The concepts herein are fully applicable to the Galileo GPS system proposed for implementation in the near future.

Those skilled in the art will also appreciate that numerous changes and modifications could be made to the embodiment described herein without departing in any way from the invention.

The invention claimed is:

1. A radar antenna having a reflector for receiving and transmitting radar pulses and an antenna boresight, said reflector having a periphery, said antenna comprising:

three or more Global Positioning System satellite signal receiving antennas said three or more Global Positioning System satellite signal receiving antennas positioned on said reflector;

said three or more Global Positioning System satellite signal receiving antennas connected pairwise to a phase comparator for detecting a plurality of first phase differences induced by a first Global Positioning satellite signal received between said three or more Global Positioning System satellite signal receiving antennas a computer for identifying an ambiguous boresight position using said first phase differences measured by said phase comparator.

2. A radar antenna as described in claim 1 wherein two of said three or more Global Positioning System satellite signal receiving antennas are straddling said boresight.

3. A radar antenna as described in claim 2 wherein said three or more Global Positioning System satellite signal receiving antennas are positioned equidistant from said boresight in a plane perpendicular to said boresight.

4. A radar antenna as described in claim 1 wherein said three or more Global Positioning System satellite signal receiving antennas are positioned along said periphery of said reflector.

5. A radar antenna as described in claim 4 wherein said three or more Global Positioning System satellite signal receiving antennas are positioned equidistantly along said periphery of said reflector.

6. A radar antenna as described in claim 4 wherein two of said three or more Global Positioning System satellite signal receiving antennas are aligned with a horizontal plane, said horizontal plane including said boresight.

7. A radar antenna as described in claim 4 wherein two of said three or more Global Positioning System satellite signal receiving antennas are aligned with a vertical plane, said vertical plane including said boresight.

8. A radar antenna as described in claim 1 wherein said phase comparator detects second phase differences induced by a second Global Positioning System satellite signal in said three or more Global Positioning System satellite signal receiving antennas, said second phase differences used to resolve ambiguities in said ambiguous boresight position derived from said first phase differences to obtain an unambiguous radar antenna position.

9. A method for identifying a boresight position of a radar antenna having a reflector for receiving and transmitting radar pulses and an antenna boresight, said reflector having a periphery, said antenna comprising the steps of:

Positioning three or more Global Positioning System satellite signal receiving antennas on said reflector along said periphery;

Connecting said three or more Global Positioning System satellite signal receiving antennas to a phase comparator for detecting a plurality of phase differences induced by a first Global Positioning System satellite signal received among said three or more Global Positioning System satellite signal receiving antennas;

Identifying an ambiguous boresight position with respect to said first Global Positioning satellite from said first phase difference measured by said phase comparator.

10. A method as described in claim 9 wherein said three or more Global Positioning System satellite signal receiving antennas are straddling said boresight.

11. A method as described in claim 9 wherein said three or more Global Positioning System satellite signal receiving antennas are positioned equidistant from said boresight ma plane perpendicular to said boresight.

12. A method as described in claim 9 wherein said three or more Global Positioning System satellite signal receiving antennas are positioned along said periphery of said reflector.

13. A method as described in claim 9 wherein said three or more Global Positioning System satellite signal receiving antennas are positioned equidistantly along said periphery of said reflector.

14. A method as described in claim 9 wherein two of said three or more Global Positioning System satellite signal receiving antennas are aligned with a horizontal plane, said horizontal plane including said boresight.

15. A method as described in claim 9 wherein two of said three or more Global Positioning System satellite signal receiving antennas are aligned with a vertical plane, said vertical plane including said boresight.

16. A method as described in claim 9 wherein said phase comparator detects a second phase difference induced by a second Global Positioning System satellite signal, said second phase difference used to resolve ambiguities in said ambiguous boresight position derived from said first phase difference.

* * * * *